(12) United States Patent
Garcia-Luna-Aceves et al.

(10) Patent No.: US 10,091,094 B2
(45) Date of Patent: Oct. 2, 2018

(54) METHOD FOR DISTANCE-VECTOR ROUTING USING ADAPTIVE PUBLISH-SUBSCRIBE MECHANISMS

(71) Applicant: The Regents of the University of California, Oakland, CA (US)

(72) Inventors: Jose Garcia-Luna-Aceves, Santa Cruz, CA (US); Qian Li, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 194 days.

(21) Appl. No.: 15/030,366

(22) PCT Filed: Oct. 16, 2014

(86) PCT No.: PCT/US2014/060922
§ 371 (c)(1),
(2) Date: Apr. 18, 2016

(87) PCT Pub. No.: WO2015/099866
PCT Pub. Date: Jul. 2, 2015

(65) Prior Publication Data
US 2016/0269275 A1      Sep. 15, 2016

Related U.S. Application Data

(60) Provisional application No. 61/891,455, filed on Oct. 16, 2013.

(51) Int. Cl.
*H04L 12/733* (2013.01)
*H04L 12/721* (2013.01)
*H04L 12/741* (2013.01)
*H04L 12/743* (2013.01)
*H04L 12/751* (2013.01)
*H04W 40/02* (2009.01)
*H04W 40/24* (2009.01)
*H04W 84/18* (2009.01)
*H04L 12/705* (2013.01)

(52) U.S. Cl.
CPC ............ *H04L 45/122* (2013.01); *H04L 45/02* (2013.01); *H04L 45/026* (2013.01); *H04L 45/44* (2013.01); *H04L 45/54* (2013.01); *H04L 45/7453* (2013.01); *H04W 40/02* (2013.01); *H04W 40/24* (2013.01); *H04W 40/246* (2013.01); *H04L 45/18* (2013.01); *H04W 84/18* (2013.01)

(58) Field of Classification Search
CPC ...... H04L 45/122; H04L 45/02; H04L 45/026; H04L 45/44; H04L 45/54; H04L 45/7453; H04L 45/18; H04W 40/02; H04W 40/24; H04W 40/246; H04W 84/18
See application file for complete search history.

(56) References Cited

U.S. PATENT DOCUMENTS

2004/0249972 A1* 12/2004 White ................... H04L 67/104
                                                          709/243
2007/0150565 A1*  6/2007 Ayyagari ................ H04L 67/12
                                                          709/223

(Continued)

*Primary Examiner* — Luat Phung
(74) *Attorney, Agent, or Firm* — Carter, DeLuca, Farrell & Schmidt, LLP (57) ABSTRACT

A distance-vector based routing protocol that integrates with adaptive publish-subscribe mechanisms by establishing routes to well-known controllers using distance-vector signaling.

20 Claims, 1 Drawing Sheet

(56) References Cited

U.S. PATENT DOCUMENTS

| | | | | |
|---|---|---|---|---|
| 2007/0189257 | A1* | 8/2007 | Suzuki | H04W 88/04 |
| | | | | 370/338 |
| 2008/0062945 | A1* | 3/2008 | Ahuja | H04W 8/005 |
| | | | | 370/342 |
| 2008/0165786 | A1* | 7/2008 | Ahuja | H04L 45/00 |
| | | | | 370/395.2 |
| 2012/0084839 | A1* | 4/2012 | Ayyagari | H04L 67/12 |
| | | | | 726/4 |
| 2013/0103836 | A1* | 4/2013 | Baniqued | H04L 41/0803 |
| | | | | 709/226 |
| 2013/0238741 | A1* | 9/2013 | Kristiansson | G06F 11/2035 |
| | | | | 709/213 |

\* cited by examiner

METHOD FOR DISTANCE-VECTOR ROUTING USING ADAPTIVE PUBLISH-SUBSCRIBE MECHANISMS

RELATIONSHIP TO OTHER APPLICATIONS

This application claims priority to and the benefit of U.S. provisional application 61/891,455 filed 16 Oct, 2013, titled "A Method for Distance-Vector Routing Using Adaptive Publish-Subscribe Mechanisms".

STATEMENT OF SUPPORT

This invention was made with government support under Grant SUB700155/SC20070363 awarded by the US Army Research Office. The government has certain rights in the invention.

FIELD OF THE INVENTION

The presently disclosed subject matter is directed towards routing in computer networks. More particularly, the present invention relates to integrated routing and discovery services in computer networks using distances and the application of this method in wireless ad hoc networks.

BACKGROUND OF THE INVENTION

Telecommunications are fundamental to the operation of modern society. The performance and cost advantages of modern telecommunications have lead to the widespread use of computer networks to transmit voice, image, and data around the world. Those computer networks enable billions of people to easily, quickly, and at low cost communicate with one another, share information, and transfer data.

Computer networks are based on an agreed set of protocols that enable messages to be transmitted from a source, passed along the telecommunication network, and received at a destination. Messages have at least two parts, the actual information that the sender wants to transfer to the destination and the routing information that controls who receives the message. The agreed upon protocols enable a sender to obtain the address of the destination and the various "stations" of the network to handle the message as it passes through the network to the destination.

A computer network is a collection of nodes (terminals or stations) that are interconnected by links (a connection between two nodes). Each node has a unique network address. Some nodes are directly connected to one another (neighbors) while others are connected through intermediate nodes. The nodes use the message routing information to route the source's message through the links and nodes from the sender node to the destination node. Each transfer of the message from one node to another is a hop.

As used herein a 'network' is an interactive system of computers that often includes peripherals, terminals, and databases that are connected by communications lines. Such communication lines may be wired, fiber optic, wireless, microwave, line of sight, repeaters or other communication paths. The term 'node' is used herein expansively. A node is a communication connection point, a communication end point, or a communication distribution point. It is an active entity capable of sending, receiving, or forwarding information over a communications channel. A physical node may be a computer, a terminal or a peripheral. A virtual node may exist as a code construct. While different networks may use different types of nodes the term node should be understood as any entity that receives and transmits messages. By 'dynamic' it is meant an interactive network or process is characterized by change and adaptation. A dynamic network adapts to changes and to inputs to and from itself as required to complete its tasks. For example, a new node may join a dynamic network. Required processes such as node addresses are kept and distributed as needed. Nodes can leave, and other networks may be merged. All the while the network still services its clients.

A small 'fixed' computer network with stable members can relatively easily determine the correct or best path for passing messages between any two nodes. But as the network gets larger the number of 'correct' paths from one node to the others gets very large. There are numerous methods of selecting 'correct' paths. However, no matter the method it is beneficial to reduce the routing information signal handling requirements.

Greatly complicating the difficultly of choosing a correct path to transfer messages between a source node and a destination node are wireless ad hoc networks. A wireless ad hoc network is a wireless network that sets itself up external of a pre-existing infrastructure. Wireless ad hoc networks are decentralized in the sense that no controlling node manages the entire network. Each wireless ad hoc network node participates in routing by forwarding messages for other nodes dynamically based on network connectivity.

An ad hoc network should be understood broadly as an improvised, possibly impromptu, dynamically formed network. An ad hoc network forms as needed to service its clients. Then it grows, shrinks, moves, and dissipates as needed.

Traditional routing protocols for computer networks and wireless ad hoc networks in particular rely on network-wide dissemination of signaling packets that provide proactive updates to the state of links (which nodes are connected by links or the distances to destinations), or on-demand requests for routes to destinations. However, as the number of nodes, dynamic connectivity changes, and new traffic flows increase both approaches tend to incur excessive signaling overhead.

Making the problem of determining message paths even more difficult are mobile ad hoc networks (MANET). In a MANET a particular node may change its physical location, which changes the nearest nodes it can directly connect to, which changes "best" message paths, which makes keeping track of good message paths even more difficult. The signaling overhead required to track all nodes in a network and to determine how to pass messages from any particular source node to any particular destination node can be prohibitive.

In a prior art computer network a particular node might be a server having services to offer, a client in need of services, or a router for passing information. To properly use a service a node must be made aware of the availability of that service. For example, to send a message a sender node must be able to find the address of a destination node and a message path. The sender node must use a service that can supply that information, and for that the sender must know how to contact the service. Publishing that information requires service discovery. Considerable work has been performed regarding implementing service discovery in computer networks. Typically service-discovery is performed by operating on top of a routing infrastructure or as an augment of an existing routing protocol.

Interestingly, prior solutions for making routing more scalable do not integrate destination-based routing with an adaptive publish-subscribe mechanism in a way that reduces the signaling required for both routing and service discovery.

Prior routing protocols in computer networks and MANETs assumed that the mappings of destination names to either addresses or routes were independent of actual routing. Various routing approaches were used, including hierarchical, limiting the dissemination of control messages, distributed hash tables (DHT), Bloom filters, virtual or geographical coordinates, or sets of dominating nodes to reduce the size of routing tables or the amount of route signaling.

Hierarchical routing schemes organize nodes into clusters. Some hierarchical routing schemes reduce signaling overhead by limiting the propagation of control messages based on their distance from an originating node. One problem with hierarchical routing schemes in a MANET is that the affiliation of nodes to specific clusters is easily broken when a node moves. Re-establishing affiliations incurs considerable signaling overhead. Unless re-established, incorrect routing can result in signaling decays based on distances to specific links Distributed hash tables (DHT)-based schemes are attractive because a distributed hash table grows only logarithmically as the number of destinations grows. However, typical distributed hash table schemes define a virtual topology, which requires substantial signaling overhead to maintain the various links of virtual topologies that are defined in large MANET networks.

Automatic Incremental Routing (AIR) avoids virtual topologies by using variable-length prefix labels instead of addresses. Another approach is using hashing node identifiers of destinations in Bloom filters, which are then used in routing updates. Unfortunately, such schemes suffer from "false positives" that incur considerable signaling overhead.

Other routing schemes for MANET rely on geographical coordinates for routing. Unfortunately such protocols require ubiquitous GPS services yet still incur routing signal overhead when discovering the geo-locations of destinations node. Some other routing schemes use virtual coordinates consisting of the distances between nodes and reference nodes. The main limitation of this type of routing scheme is that the virtual coordinates of multiple nodes may be assigned the same virtual coordinates. This is because there is simply no inherent uniqueness to a specific vector of distances to beacons. The result is either possible incorrect routing or the use of additional signaling (typically flooding) to resolve false positives.

There are also many proposals in the prior art to reduce the number of relays needed to forward signaling messages for a given number of destinations. The best known example uses multipoint relays, for example, P. Jacquet, P. Muhlethaler, T. Clausen, A. Laouiti, A. Qayyum, and L. Viennot, "Optimized Link State Routing Protocol for Ad Hoc Networks," IEEE INMIC 2001, pages 62-68, 2001. However, such proposals require the establishment and maintenance of "connected dominating sets," i.e., the nodes selected to forward signaling messages must form a connected subgraph. This usually requires a large subset of nodes, especially in dynamic topologies.

There has also been work performed on resource and service discovery in ad hoc networks. Interestingly, such work either assumes that names are mapped to addresses and that routing to those addresses is independent of or augmented by existing routing protocols of service discovery functionality.

In addition to the classic routing schemes discussed above, ad hoc networks can also simply use flooding for forwarding data. A sender sends a message to its neighbors, which then pass that message on to its other neighbors, and so on. This approach involves very large signaling overhead, especially as the wireless ad hoc network grows.

In view of the foregoing a new approach to routing in computer networks based on publish-subscribe mechanisms would be beneficial. Even more beneficial would be an adaptive protocol for routing in wireless ad hoc networks. In particular, an adaptive protocol that uses distance vectors for routing in computer networks and that integrates a sub-set of nodes to serve as controllers that maintain routes to nearby destination nodes, maintains routes to all known controllers using distance vectors, and uses publish-subscribe mechanisms in which destinations inform controllers of routes to them and in which sources obtain routes to destinations would be useful.

BRIEF SUMMARY OF THE INVENTION

The principles of the present invention provide for a novel approach to routing in computer networks, and MANETs in particular. The approach uses publish-subscribe mechanisms in an adaptive distance-vector routing protocol. In particular, the new approach uses distance-vector protocols for routing and integrates a sub-set of nodes to serve as controllers that maintain routes to nearby destination nodes, maintains routes to all known controllers using distance vectors, and uses publish-subscribe mechanisms in which destinations inform controllers of routes to them and in which sources obtain routes to destinations.

The principles of the present invention are incorporated in a network that implements scalable integrated destination-based routing using adaptive publish-subscribe mechanisms. First a subset of all nodes is selected to act as controllers that maintain routes to nearby destinations. The routes to all known controllers are then maintained using distance vectors. Publish-subscribe mechanisms are then implemented in which destination nodes inform controllers of routes to them and from which sources obtain routes to destinations. Beneficially the adaptive publish-subscribe mechanisms support routing to specific destination nodes as well as copies of content that can be replicated anywhere in the network.

The principles of the present invention further provide for a method routing that establishes a wireless network comprised of a plurality of nodes, with each node having a unique node identifier (such as an address). Then, dynamically selecting a subset of those nodes to serve as controllers, thereby dividing the nodes into a plurality of controller nodes and a plurality of destination nodes. Furthermore, that method includes maintaining routes to nearby destination nodes of each controller node, thereby forming local controllers, maintaining routes to all controllers in each controller based on distance vectors, and using publish-subscribe mechanisms in which destinations inform local controllers of routes to them and sources obtain routes to local controllers of destination nodes.

BRIEF DESCRIPTION OF THE DRAWINGS

The advantages and features of the present invention will become better understood with reference to the following detailed description and claims when taken in conjunction with the accompanying drawings, in which like elements are identified with like symbols, and in which:

DETAILED DESCRIPTION OF THE INVENTION

The presently disclosed subject matter now will be described more fully hereinafter with reference to the accompanying figures in which one embodiment is shown. However, it should be understood that this invention may take different forms and thus the invention should not be construed as being limited to the specific embodiment set forth herein.

All documents and references referred to in this disclosure are hereby incorporated by reference for all purposes. Additionally, in the figures like numbers refer to like elements throughout. The terms "a" and "an" as used herein do not denote a limitation of quantity, but rather denote the presence of at least one of the referenced items.

Figure 1:
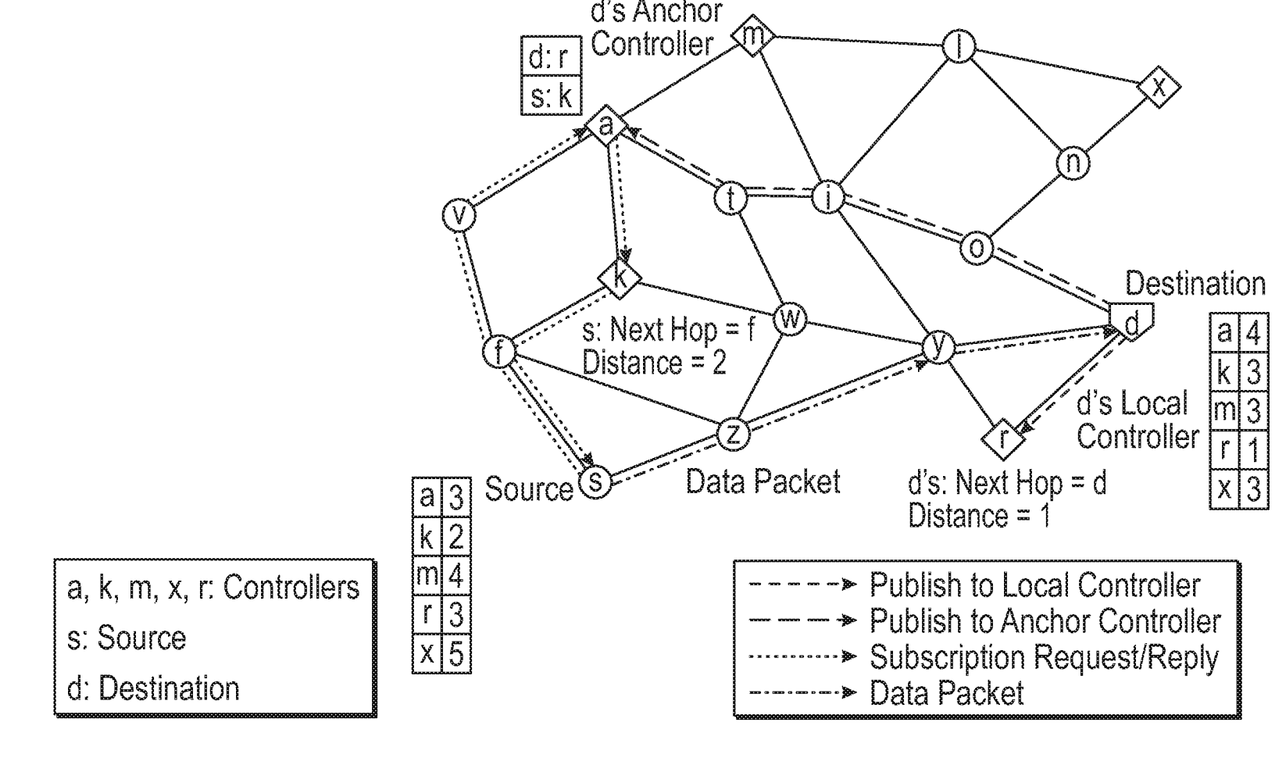
FIG. 1 is a topological view of a distributed network having links and a variety of nodes for implementing a method that is in accord with the principles of the present invention.

The present invention is described herein with reference to FIG. 1. Specifically, the present invention provides an Adaptive Publish-Subscribe Distance Vector (APDV) approach to maintaining a communication network that is or that includes a network or sub-network. APDV assumes that each network node is assigned a network-wide unique node identifier. APDV can take advantage of the broadcast nature of radio links by having each network node broadcast control messages to all neighbors once, rather than transmitting a separate control message to each neighboring node.

In APDV a subset of nodes are dynamically selected to serve as controllers. Once selected a controller acts as a directory server for other nodes by maintaining routes to nearby destinations that are denoted by node identifiers. This dynamic selection is based on a distributed algorithm that selects controllers to ensure that each non-controller destination node is within a maximum distance r from a minimum number k of local controllers. As a side effect a controller node informs each destination node about routes to its one-hop and two-hop neighbors.

FIG. 1 illustrates a proto-typical computer network with APDV. FIG. 1 is useful for illustrating and explaining the basic operation of APDV. In FIG. 1 each non-controller node has at least one local controller within two hops. The local controllers are nodes a, k, m, x and r. As is described subsequently those nodes are dynamically elected to be the local controllers.

In APDV all nodes maintain routes to all controllers using a loop-free distance-vector routing algorithm. For simplicity of explanation it will be assumed that a node maintains a single route to each controller. However, in practice APDV can be readily extended to use multiple loop-free paths. Each non-controller node contacts each of its local controllers to publish its presence. That is accomplished by a non-controller node, for example non-controller node d sending a publish message to each of its local controllers with the mapping (d, $\{1^1_d,..., 1^k_d\}$), where $1^i_d$ (1≤i≤k) is a local controller for the non-controller node d. Each local controller $1^i_d$ of the non-controller node d and each relay node (a node that passes information between other nodes) between the non-controller node d and a local controller that receives the publish request stores a tuple stating the address of the non-controller node d, the next hop to non-controller node d, and the address of the local controllers $\{1^1_d, ..., 1^k_d\}$.

In addition, the non-controller node d uses a common hash function to select an anchor controller $a_d$, which is a selected controller for storing the mapping (d, $\{1^1_d, ..., 1^k_d\}$). That mapping is the addresses of all of the local controllers of non-controller node d. That mapping is sent to the anchor controller $a_d$. The anchor controller $a_d$ and the relay nodes between d and $a_d$ cache the mapping information. In FIG. 1, node d has published its presence with its local controller (node r) and its anchor controller (node $a_d$).

The foregoing produces the important result that each local controller node r has a route to non-controller node d; the relay nodes between each local controller node r and non-controller node d have the path from local controller node r to non-controller node d; the anchor controller $a_d$ has a route to each local controller node r; and the relay nodes between the anchor controller $a_d$ and each local controller node r have the path between them.

A source node requiring a route to a non-controller node d uses the same common hash function on the identifier of node d to find the anchor controller for d, $a_d$. Thus any source node can send a subscription request to anchor controller $a_d$ by providing d and (s, $\{1^1_s, ... 1^k_s\}$), where $1^1_s$ (1≤i≤k) is a local controller for node s. The controller $a_d$ responds with the mapping (d, $\{1^1_d, ..., 1^k_d\}$) and sends that response towards the nearest local controller for source s selected from the set $\{1^1_s, ..., 1^k_s\}$. The answer is redirected to source s by either the selected controller $l^j_s$ or the first relay node along the route from $a_d$ to controller k with a route to s.

Node s can then send data packets to destination d by sending them towards the nearest controller in the set $\{1^1_d, ..., 1^k_d\}$. Those packets will be redirected to d after either reaching the selected controller in $\{1^1_d, ..., 1^k_d\}$ or a node along the route from s to the selected controller with an active route to d. In FIG. 1, node s subscribes to node d by contacting anchor $a_d$, which maintains the mapping (d, r) and returns it to node s by sending its response towards node k, which is the local controller of node s. Node $a_d$ also caches the mapping (s, k). Node s then sends data packets to d by sending them towards controller r; however, node y is in the route from s to r and also has a route to d, and forwards the data packets directly to d.

A proper implementation of APDV requires appropriate methods to select controllers, to maintain the routes to the controllers, and then publishing and subscribing to destinations using the controllers. Furthermore, the information maintained at each node must allow that node to select and route to controllers, to route to local destinations, and to learn the local controllers associated with distant destinations on demand.

To achieve the foregoing a non-controller node i maintains a controller table ($CT^i$) that states information about all controllers elected in the network (the election process is described subsequently). The non-controller node i also maintains a neighbor controller table ($NCT^i$) stating information reported by each neighbor of non-controller node i regarding all controllers elected in the network; a neighbor table ($NT^i$) stating information about all one-hop and two-hop neighbors of non-controller node i; a neighbor local routing table ($NLRT^i$) stating routing information reported by each neighbor regarding all destinations within two hops and some destinations within r hops; a local routing table ($LRT^i$) stating routing information about all destinations within two hops and some destinations within r hops; a neighbor routing table ($NRT^i$) stating information reported by each neighbor regarding distant destinations; and a routing table ($RT^i$) stating information about distant destinations.

APDV employs a soft-state to operate efficiently. A node transmits its HELLOs periodically every 3 seconds. A HELLO includes some or all the updates made to its node tables. A node stores all the information from the HELLOs it receives from its neighbors, and also caches information it receives in subscription or publication requests from neighbors. Entries in $RT^i$ and $NRT^i$ are populated by the publish-subscribe signaling described subsequently. $NT^i$, $CT^i$, $NCT^i$, $LCL^i$, $NLRT^i$, and $LRT^i$ are updated by the exchange of HELLOs among one-hop neighbors. In a network with point-to-point links, a node transmits a HELLO over each of the links it shares with its neighbor nodes. In a network with broadcast links (e.g., a wireless network based on broadcast links) a node transmits a HELLO once and addresses it to all its neighbors.

For each controller c selected in the network, $CT^i$ specifies: the identifier of node c ($nid^i_c$); the distance from i to c ($d^i_c$); the successors (next hops) from i to c ($s^i_c$); and a sequence number ($sn^i_c$) used to avoid routing loops. N $CT^i$ stores the controller tables reported by each neighbor of node i. The entry for controller c reported by neighbor j and stored in $NCT^i$ is denoted by $\{nid^i_{cj}, d^i_{cj}, sn^i_{cj}\}$.

For each neighbor j of node i, $NT^i$ specifies: the identifier of the node ($nid^i_j$); a sequence number ($sn^i_j$) created by j and used to determine that the entry is the most recent from node J; a controller status flag ($cs^i_j$) stating whether or not node j is a controller; the controller counter ($k^i_j$) stating the number of controllers within r hops of node j; and the local controller list ($LCL^i_j$) consisting of the identifiers of all controllers within r hops of node j. An entry for neighbor v in $NT^j$ sent in a HELLO to node i is denoted by $\{nid^j v, sn^j v, cs^j v, k^j v, LCL^j v\}$, and the same entry stored in $NT^i$ is denoted $\{nid^i_{vj}, sn^i_{vj}, cs^i_{vj}, k^i_{vj}, LCL^i_{vj}\}$.

An entry for destination j listed in $LRT^i_j$); the identifier of the node ($nid^i_j$); a sequence number ($sn^i_j$) created by j used to avoid routing loops; the distance from i to j ($d^i_j$); the successor in the route to j ($s^j_i$); and the local controller list of node j ($LCL^i_j$), which may be a link to $NT^i$ if the node is within two hops. An update made by neighbor j to $LRT^j$ communicated in a HELLO is denoted by $\{nid^j_v, sn^j_v, d^j_v, LCL^j_v\}$. The corresponding entry stored at node i in $NLRT^i$ is denoted by $\{nid^i_{vj}, sn^i_{vj}, d^i_{vj}, LCL^i_{vj}\}$. An entry for destination v listed in $RT^i$ simply specifies the identifier of the node ($nid^i_v$) and the list of local controllers for node v ($LCL^i_v$), because node i maintains the routes to all controllers in $CT^i$.

Node i includes its own information in $NT^i$, i.e., it stores an entry corresponding to $nid^i_j$, uses the information in its HELLOs. A HELLO from node i contains: $nid^i_i, sn^i_i, cs^i_i, k^i_i$, and updates to $NT^i$, $CT^i$ and $LRT^i$. An update to $NT^i$ regarding neighbor j consists of the tuple $\{nid^i_j, sn^i_j, cs^i_j, k^i_j, LCL^i_j\}$. An update to $CT^i$ regarding controller c consists of the tuple $\{nid^i_v, sn^i_v, d^i_v, LCL^i_v\}$.

With the foregoing information stored and exchanged within the various nodes a distributed selection of controllers is required. In APDV selecting the controllers amounts to selecting a dominating set C of nodes in the network to serve as controllers. Every node u that is not a member of C (called a simple node) is at a distance smaller than or equal to r hops from at least k nodes in C (called controllers). A node u is said to be (k, r) dominated (or covered) if there are at least k nodes in C within r hops from u. There is a large body of work on dominating sets in graphs. Reference for example T. Haynes, S. Hedetniemi, and P. Slater "Fundamentals of Domination in Graphs," Marcel Dekker, 1998. Many other distributed algorithms exist to approximate minimum connected dominating sets MCDS with constraints.

However, the controller selection scheme used in APDV is simply aimed at obtaining a set of controllers that cover all nodes but it need not be a MCDS, and maintaining routes to all selected controllers. The APDV method is based on HELLO messages exchanged among one-hop neighbors. To keep the selection algorithm and signaling simple, only distances to controllers and node identifiers are used as the basis for the selection of controllers.

In ADPV controllers self-select themselves to become controllers or to stop being controllers. A given node i determines whether to add or delete its own entry in $CT^i$, respectively, according to the Controller Addition Rules (CAR) presented below in Algorithm 1 and the Controller Deletion Rules (CDR) presented below in Algorithm 2.

Algorithm 1 is represented as pseudo code for adding controllers to the topology according to CAR:

```
#define DEFAULT_HELLO_INERVAL 3*SECOND
#define DEFAULT_UPDATE_INERVAL 20*SECOND
Algorithm 1 Controller Addition Rule (CAR)
Init: CT^i=φ and NT^i=φ
if cs^i_i==false && k^i_i<k then
    minID=nid^i_i;
    for ∀j∈NT^i do
        if j∉CT^i && k^i_j<k then
            minID=Min (minID, nid^i_j);
        end if
    end for
    if minID==nid^i_i then
        cs^i_i=true;
        k^i_i++;
        CT^i←{nid^i_i=i, d^i_i=0, sn^i_i=sn^i_i+1};
        LCL^i_i←{nid^i_i=i};
    end if
end if
```

Algorithm 2 is represented as pseudo code for deleting controllers from the topology according to CDR:

```
Algorithm 2 Controller Deletion Rule (CDR)
If cs^i_i==true && k^i_i>k then
    CanDelete==true;
    for ∀j∈NT^i do
        if j∉LCL^i_i && |LCL^i_j−{i}|<k then
            CanDelete=false;
            break;
        else if j∈LCL^i_i && nid^i_i<nid^i_j then
            CanDelete=false;
            break;
        end if
        if CanDelete==false then
            break;
        end if
    end for
    if CanDelete==true then
        cs^i_i=false;
        k^i_i−−;
        CT^i←{nid^i_i=i, d^i_i=∞, sn^i_i=sn^i_i+1}
        LCL^i_i←LCL^i−{i};
    end if
end if
```

Node i is initialized with $CT^i=\varphi$ and $NT^i=\varphi$, and waits for a few seconds to start receiving HELLOs from nearby nodes. Hence, according to the CAR, node i self selects itself as a controller when it is first initialized, unless node i has received HELLOs from neighbors that prompt it not to include itself as a controller based on the CDR (see below).

Node i updates an entry for $j \neq i \in CT^i$ according to the rules shown in Algorithm 1. Those rules ensure that no loops are formed for routes to controllers. Once node i has updated $NT^i$ and $CT^i$, by processing HELLOs received from neighbors, it computes its local controller list ($LCL^i$) from $CT^i$, such that $v \in LCL^i$ if $div \leq r$, and sets $k^i_{i|LCL^i} = 1$.

The local controller list (LCL) at each node, and each new state per node is determined by the reception of HELLOs from all neighbors, followed by the addition or deletion of controllers in the LCL resulting from applying CAR and CDR, thereby deleting controllers that are farther than 2 hops away, or deleting a controller after the successor to that controller sends an update with a deletion of the controller.

Following the CAR each new node selects itself as a controller after initialization and sends a HELLO. Nodes do not wait for HELLOs to arrive. After receiving a HELLO from each neighbor, a node may add new controllers reported in the HELLOs. However, it also may delete itself from being a controller based on the CDR.

For simplicity of explanation it is assumed that each node maintains a single route to each controller selected in the network using the updates to controller tables included in HELLOs.

APDV uses a distance-vector routing approach to maintaining routes to controllers. To guarantee loop-free routes, APDV uses sequence numbers that restrict the selection of next hops towards a given controller by any node, such that only those neighbors with shorter distances to the controller or with a more recent sequence number reported by the controller can be considered as successors. An important aspect of APDV is that entries for controllers can be deleted on purpose as a result of the CDR, rather than only as rare occurrences due to failures or network partitions. Together with the transmission of periodic HELLOs, the Reset Controller Rule (RCR) and the Update Controller Rule (UCR) discussed below address this functionality.

The process of routing to controller begins with the set $N^i$; the set of one-hop neighbors of node i. Node i updates $CT^i$ based on HELLOs from neighbor $j \in N^i$ or the loss of connectivity to neighbor j. If node i loses connectivity to node j, the entries in $CT^i$ are deleted. Once node i is selected as a controller, it is the only node that can change the sequence number for its own entry in controller-table updates sent in HELLOs.

When a given node i decides to delete itself as a controller based on the CDR its entry must be deleted as a controller in the rest of the network. To accomplish this node i uses a Reset Controller Rule (RCR) (provided below) to set its self-entry with an infinite distance and an up-to-date sequence number for a finite period of time T before deleting its self-entry from $CT^i$. This ensures that the rest of the nodes delete i from their controller tables.

If node i receives a HELLO from j or experiences a link failure that makes it update $CT^i$ for entry $c \neq i$: $\{nid^i_{cj}, d^i_{cj}, sn^i_{cj}\}$, node i updates its entry for c in $CT^i$ according to Update Controller Rules (UCR), see Algorithm 3 below, which forces node i to propagate a reset update or to select a successor to controller c that is either closer to c or has reported a more recent sequence number from c.

Algorithm 3 is represented as pseudo code for UCR used in the topology:

Algorithm 3 Update Controller Rule (UCR)
Event Trigger: node i updates entry for c in $CT^i$
If $\exists_{q} \in NT^i$ && $sn^i_{cj} > sn^i_c$ then
  if $n == s^i_c$ && $sn^i_{cj} > sn^i_c$ && $d^i_{cv} == \infty$ then
    $sn^i_c = sn^i_{cv}$;
    $d^i_c = \infty$;
  else
    maxSN = $sn^i_c$;
    for $\forall_v \in NT^i$ do
      maxSN = Max(maxSN$_i$, $sn^i_c$);
    end for
    minD = $d^i_c$;
    for $\forall f \in NT^i$ do
      if $sn^i_{cj} == $ maxSN then
        if minD > $d^i_{cj} + 1$ then
          minD = $d^i_{cj} + 1$;
          temp_s = f;
        end if
      end if
    end for
    $d^i_c$ = minD;
    $s^i_c$ = temp_s;
    $sn^i_c$ = maxSN;
  end if
else
  minD = $d^i_c$;
  for $\forall_j \in NT^i$ do
    if $sn^i_{cj} == sn^i_c$ && $d^i_{cj} < d^i_c$ then
      if minD > $d^i_{cj} > d^i_{cj} + 1$ then
        minD = $d^i_{cj} > d^i_{cj} + 1$;
        temps_s = f
      end if
    end if
  end for
  $d^i_c$ = minD;
  $s^i_c$ = temp_s;
end if The RCR is:
RCR (Reset Controller Rule):
If node i must delete itself from $CT^i$ using CDR then
set $d^i_i = \infty$; $sn^i_i = sn^i_i + 1$; reset-timer$^i = T$ Nodes learn about routes to controllers and to one- and two-hop neighbors. However, exchanging HELLOs does not provide routes to destinations many hops away. To enable sources to obtain routes to arbitrary destinations without incurring network-wide dissemination of signaling messages, APDV uses a publish-subscribe mechanism for name-to-route resolution.

The basis of the publish-subscribe mechanism used in APDV is the use of consistent hashing. This is similar to recent proposals for distributed name resolution in MANETs that also use consistent hashing to map the names of destinations to one of several predefined directory sites storing the name-to-address mapping for destinations. Key differences exist however between the APDV approach and the prior art. Those differences include: (a) the directories (i.e., controllers) are selected dynamically; (b) a node publishes its presence with multiple controllers; and (c) name resolution is integrated with the selection of and routing to controllers, rather than running on top of routing. Hence, in APDV, controllers maintain name-to-route mappings rather than storing name-to-address mappings and then using an underlying routing protocol to obtain the routes for known addresses.

For ease of explanation and understanding the APDV publish-subscribe mechanism described herein assumes that node identifiers constitute the names for which routes must be found. However, the same APDV publish-subscribe mechanism can be used to support information-centric networking, such that nodes publish and subscribe to names of destinations, content or services, rather than just node identifiers.

Publishing in APDV consists of having a local controller know the route to a given destination or having an anchor controller know the mapping from a node identifier to a list of local controllers. Subscribing in APDV consists of a node requesting a way to reach a named destination through an anchor controller.

In APDV, node i publishes itself with the k controllers listed in $LCL^i$, and with one or more anchor controllers. The local controllers in $LCL^i$ are within r hops of node i and serve as the "landmarks" for other nodes to submit data to node i, given that nodes far away from node i do not have routes to node i. Accordingly, a local controller for node i must maintain a route to node i, and it also maintains the mapping (i, $LCL^i$), so that it can find alternate ways to reach node i if its route to i fails. The anchor controllers are needed for nodes far away from destinations to obtain the mappings between the identifiers of those destinations and their local controllers.

For simplicity, the assumption is that a single anchor controller is used for any one node. The anchor controller for node i (denoted by $a_i$) is obtained by using a network-wide consistent hash function that maps the identifier of node i into the identifier of one of the controllers selected in the network. Controller $a_i$ must store the mapping (i, $LCL^i$), so that it can provide any node v far away from node i the list $LCL^i$, with which node v can send data packets towards the local controller in $LCL^i$ that is nearest to node v according to its controller table $CT^v$.

The forwarding of a publication request from a node to its local controllers is done by the exchange of HELLOs. Given that nodes maintain loop-free routes to all controllers, publication requests directed to local controllers of nodes are forwarded over the reverse loop-free routes already established from local controllers to nodes. The routes maintained by local controllers to nearby nodes are refreshed periodically; each node creates a new publication request by increasing the sequence number included in the LRT self-entry of its own HELLO. If node i receives a HELLO from neighbor j with a publication request originated by node v, which consists of update to $LRT^j$ for destination v($\{nid^j_v, sn^j_v, d^j_v, LCL^j_v\}$) then node I forwards the request (i.e., it includes the $LRT^i$ entry $\{nid^i_v, sn^i_v, d^i_v, LDL^i_x\}$ in its own HELLO) if it is the successor for node j to any of the controllers listed in $LCL^j_v$. Once a local controller c receives an entry for destination v and $c \in LCL^v$, then c publishes (i.e. stores) the entry $\{nid^c_v, sn^c_v, d^c_v, s^c_v, LCL^c_v\}$, where $s^c_v$ is the neighbor from which it received the publication request. Controller c may also forward it if it is the successor to another controller in $LCL^v$ for the neighbor from which it received the publication request.

The submission of a publication request from node i to its anchor controller $a_i$ is done by node i using the network-wide consistent hash function on the set of identifiers in $CT^i$ to obtain hash(i)=$a_i$, where $a_i \in CT^i$. After that, node i sends a publication request to its successor towards its anchor controller $a_i$ with the tuple $\{nid^i_i, sn^i_i, d^i_i, LCL^i_i\}$. Each node v in the route from node i to controller $a_i$ forwards the publication request towards $a_i$ and caches the tuple $\{nid^v_i, sn^v_i, d^v_i, s^v_i, LCL^v_i\}$. Once controller $a_i$ receives the request, it stores the tuple $\{nid^{a_i}_i, sn^{a_i}_i, d^{a_i}_i, s^{a_i}_i, LCL^{a_i}_i\}$. Hence, each node processing a publication request learns the route to the node issuing the request, and the anchor controller is able to obtain the mapping needed to redirect nodes sending subscription requests to the local controllers of node i.

The forwarding of subscription requests is handled in much the same way described above for the case of publication requests. When node o has data for destination j $\notin CT^o$, it computes hash (j)=$a_j$, where $a_j \in CT^o$ and sends its subscription request towards $a_j$. The subscription request from node o regarding destination j states the identifier of node j, its anchor controller $a_j$, and $LCL^o$. When $a_j$ receives o's request, it responds with the tuple $\{ni^{a_j}_j, sn^{a_j}_j, LCL^{a_j}_j\}$ and sends the response to the nearest controller it finds in $LCL^o$.

Node o stores the tuple $\{nid^o_j, sn^o_j, LCL^o_j\}$ in $RT^o$ upon receiving the reply to its subscription. Data packets from o are then sent towards the controllers in $LCL^o_j$ that are the closest to node o. A data packet must specify the sender, the destination, and the selected local controller of the destination. This can be done by encapsulating the header of the packet stating the origin and the destination with a header stating the origin and the selected local controller of the destination. Once the packet reaches a relay node y with an active route for the destination, the packet is forwarded directly to the destination itself, as long as the distance from node y to the destination is at most r hops.

In one embodiment of APDV, the functional steps required for its operation can be organized as illustrated in the pseudo-code listed in Algorithm 4 below. That pseudo-code can be implemented in a variety of ways as part of a routing protocol designed for wired networks or wireless networks.

It should also be understood that while the figures and the above description illustrate the present invention, they are exemplary only. They are not intended to be exhaustive or to limit the invention to the precise forms disclosed, and obviously many modifications and variations are possible in light of the above teaching. Others who are skilled in the applicable arts will recognize numerous modifications and adaptations of the illustrated embodiments that remain within the principles of the present invention. Therefore, the present invention is to be limited only by the appended claims.

Algorithm 4 is represented as pseudo code for the overall functional steps of APDV:

APDVInit(i)
{
    nid $^i_i$=i;
    cs$^i_i$=false;
    k$^i_i$=0;
    sn$^i_i$=1;
    CT$^i$=φ;
    NCT$^i$=φ;
    NCT$^i$=φ;
    NCT$^i$=φ;
    NT$^i$=φ;
    LRT$^i$=φ;
    NLRT$^i$=φ;
    RT$^i$=φ;
    NRT$^i$=φ;
    LCL$^i$=φ;
    APDVSetTimer (i, SendHello, DEFAULT_HELLO_INERVAL);

```
APDVSetTimer (i, CheckRoutinglnfo, DEFAULT_
    UPDATE_INERVAL);
APDVSetEventHandler (i, APDVHandleEvent);
APDVSetSignalingPacketHandler (i, APDVHandleSig-
    nalingPacket);
}
APDVHandleEvent (i, eventType)
}
    switch (eventType)
    {
        case SendHello:
        {
            SendHello(i);
            APDVSetTimer (i, SendHello, DEFAULT_HEL-
                LO_INERVAL);
        }
        case CheckRoutinglnfo:
        {
            CheckUpdate(i);
            APDVSetTimer(i, CheckRoutinglnfo, DEFAULT_
                UPDATE_INERVAL);
        }
    }
}
HandleHello(i, packet)
{
    UpdateNT(i, packet)
    UpdateCT(i, packet, i. Call (UCR));
    i.Call(CAR);
    i.Call(CDR);
    UpdateLCL (i, i.Call(UCR));
    SendLocalControllerUpdate(i);
}
APDVHandleSignalingPacket(i, packet, packetType)
{
    Switch(packetType)
    {
        case HELLO
        {
            HandleHello(i, packet);
        }
        case Anchor Update;
        {
            HandleAnchorUpdate(i, packet);
        }
    }
}
APDV(i)
{
    APDCInit(i)
}
```

The invention claimed is:

1. A method of routing, the method comprising:
  (i) establishing a computer network comprising a plurality of nodes, each node of said plurality of nodes having a unique node identifier; the plurality of nodes including an anchor controller storing a mapping having addresses of each of the plurality of nodes;
  (ii) dynamically selecting a subset of said plurality of nodes to serve as controllers, said selecting based on a distributed algorithm that selects controllers such that each non-controller node is within a maximum distance from a minimum number of local controllers and wherein dynamically selecting controllers is performed in accord with predetermined Controller Addition Rules, thereby dividing said plurality of nodes into a plurality of controller nodes and a plurality of destination nodes;
  (iii) maintaining routes to nearby destination nodes of each controller node, thereby forming local controllers;
  (iv) maintaining routes to all controllers in each controller based on distance vectors; and
  (v) using publish-subscribe mechanisms in which destination nodes inform local controllers of routes to them and sources obtain routes to local controllers of the destination nodes nodes, wherein the source obtaining routes includes:
    (a) sending a subscription request from a source node to the anchor controller, the subscription request including a destination node and a source node controller selected from the local controllers;
    (b) sending the mapping to the source node controller from the anchor controller;
    (c) forwarding the mapping to the source node;
    (d) sending a data packet based on the mapping to a destination node controller of the destination node, the destination node being selected from the local controllers; and
    (e) forwarding the data packet from the destination node controller to the destination node.

2. The method of routing of claim 1, wherein dynamically selecting controllers is performed by nodes of said plurality of nodes deselecting themselves as controllers and wherein deselecting is performed in accord with Controller Deletion Rules.

3. The method of routing of claim 1, wherein maintaining routes to all controllers uses sequence numbers to restrict selection of next hops towards a given controller such that only neighbors with shorter distances to the controller can be considered as successors.

4. The method of routing of claim 3, wherein maintaining routes to all controllers include deleting controllers based on Controller Deletion Rules, and wherein controllers are deleted based on loss of connectivity to neighbors.

5. The method of routing of claim 4, wherein controllers are deleted based on HELLOs from neighbors.

6. The method of routing of claim 5, wherein controllers are updated based on an Update Controller rule.

7. The method of routing of claim 1, wherein maintaining routes to each nearby destination node of each controller node in each controller is performed by:
  (i) each non-controller node d sending a publish message to each of its local controllers with a mapping (d, $\{I^1_d, \ldots, I^k_d\}$), where $I^i_d$ ($1 \leq i \leq k$) is a local controller for non-controller node d;
  (ii) each local controller $I^i_d$ of non-controller node d and each destination node between said each local controller $I^i_d$ and said non-controller node d receiving said publish message stores a tuple stating an address of non-controller d, a next hop to non-controller d, and $\{I^1_d, \ldots, I^k_d\}$; and
  (iii) each non-controller node d selecting an anchor node $a_d$ using a hash function;
  (iv) each non-controller node d sends said selected anchor node $a_d$ the mapping (d, $\{I^1_d, \ldots I^k_d\}$); and
  (v) said selected anchor node $a_d$ and relay nodes between d and $a_d$ cache the mapping (d, $\{I^1_d, \ldots, I^k_d\}$).

8. The method of routing of claim 7, further including determining a path from a source node s to a destination node d by performing:

(i) having a node s identifying anchor $a_d$ using said hash function;
(ii) said node s sending said identified anchor $a_d$ addresses d and (s, {$l^1_s$, ..., $l^k_s$}), where $l^i_s$ (1≤i≤k) is a local controller for node s;
(iii) anchor $a_d$ returns a mapping (d, r) to node s by sending a response towards a local controller of node s;
(iv) said local controller of node s passes said mapping (d, r) to node s, and
(v) node s sends data packets to d by sending them towards controller r.

9. The method of routing of claim 7, wherein maintaining routes to named services or content objects is performed by performing:
(i) each non-controller node d selecting an anchor node $a_o$ using a hash function on a name of a service or content o that it wants to publish;
(ii) each non-controller node d sends said selected anchor node $a_o$ a mapping (o, d, {$l^1_d$, ..., $l^k_d$}); and
(iii) said selected anchor node $a_o$ and the relay nodes between d and $a_o$ cache the mapping (o, d, {$l^1_d$, ..., $l^k_d$}).

10. The method of routing of claim 9, further including determining a path from a subscriber node s to a named service or content object o by performing:
(i) a node s identifying anchor $a_o$ using a hash function on the name of the service or content object o required by s;
(ii) said node s sending said identified anchor $a_o$ the name o and (s, {$l^1_s$, ..., $l^k_s$}), where $l^i_s$ (1≤i≤k) is a local controller for node s;
(iii) anchor $a_o$ returns a mapping (o, d, {$l^1_d$, ... $l^k_d$}) to node s by sending a response towards a local controller of node s;
(iv) said local controller of node s passes said mapping (o, d, {$l^1_d$, ... $l^k_d$}) to node s, and
(v) node s sends request for object o to d by sending them towards a local controller of d.

11. The method of routing of claim 9, further comprising constructing a name of a service or content object to include a prefix component and a suffix component, with the prefix component being used in the hash function used to select an anchor controller for a named service or content object.

12. The method of routing of claim 10, wherein establishing a computer network establishes an ad hoc network.

13. The method of routing of claim 12, wherein the ad hoc network is a wireless network.

14. The method of routing of claim 1, wherein each non-controller node i maintains the following:
a controller table ($CT^i$) that states information about network controllers;
a neighbor controller table ($NCT^i$) stating information reported by each neighbor of non-controller node i regarding all controllers elected in the network;
a neighbor table ($NT^i$) stating information about all one-hop and two-hop neighbors of non-controller node i;
a neighbor local routing table ($NLRT^i$) stating routing information reported by each neighbor regarding all destinations within two hops and some destinations within r hops;
a local routing table ($LRT^i$) stating routing information about all destinations within two hops and some destinations within r hops;
a neighbor routing table (N $RT^i$) stating information reported by each neighbor regarding distant destinations; and
a routing table ($RT^i$) stating information about distant destinations.

15. The method of routing of claim 14, wherein entries in $RT^i$ and N $RT^i$ are populated by publish-subscribe signaling and wherein using publish-subscribe mechanisms uses a network-wide consistent hash function.

16. The method of routing of claim 15, wherein publishing is performed by:
a node i using the network-wide consistent hash function on a set of identifiers in $CT^i$ to obtain hash(i)=$a_i$, where $a_i \in CT^i$;
node i sending a publication request towards its anchor controller $a_i$ with a tuple {$nid^i_i$, $sn^i_i$, $d^i_i$, $LCL^i_{i,}$};
nodes in the route from node i to controller $a_i$ forwarding the publication request towards $a_i$; and
$a_i$ caching a tuple {$nid^v_i$ $sn^v_i$, $d^v_i$, $s^v_i$, $LCL^v_i$}.

17. The method of routing of claim 15, wherein publishing is performed by:
a node o using the network-wide consistent hash function on a set of identifiers in $CT^o$ to obtain hash(i)=$a_j$, where $a_j \in CT^o$;
node o sending a subscription request towards its anchor controller $a_j$ stating an identifier of node j, its anchor controller $a_j$, and $LCL^o$;
nodes in the route from node o to controller $a_j$ forwarding a publication request towards $a_j$; and
$a_j$ receiving o's request and sending a tuple {$ni^{aj}_j$, $sn^{aj}_j$ $LCL^{aj}_j$} to a nearest controller it finds in $LCL^o$;
the nearest controller in $LCL^o$ sending a tuple {$ni^{1j}_j$, $sn^{1j}_j$ $LCL^{aj}_j$} to o.

18. The method of routing of claim 17, wherein node o stores a tuple {$nid^o_j$, $sn^o_j$, $LCL^o_j$} in $RT^{jo}$ upon receiving a reply to its subscription; and wherein node o sends data packets towards controllers in $LCL^o_j$ that are closest to node o for transmission to node i.

19. The method of routing of claim 1, wherein establishing a computer network establishes an ad hoc network.

20. The method of routing of claim 19, wherein the ad hoc network is a wireless network.

* * * * *